Jan. 24, 1928.  1,657,132
J. MERLE
METHOD OF MANUFACTURING SOLID PRODUCTS OUT OF ONE OR
MORE LIQUID OR PLASTIC MATERIALS
Filed March 27, 1923   2 Sheets-Sheet 2

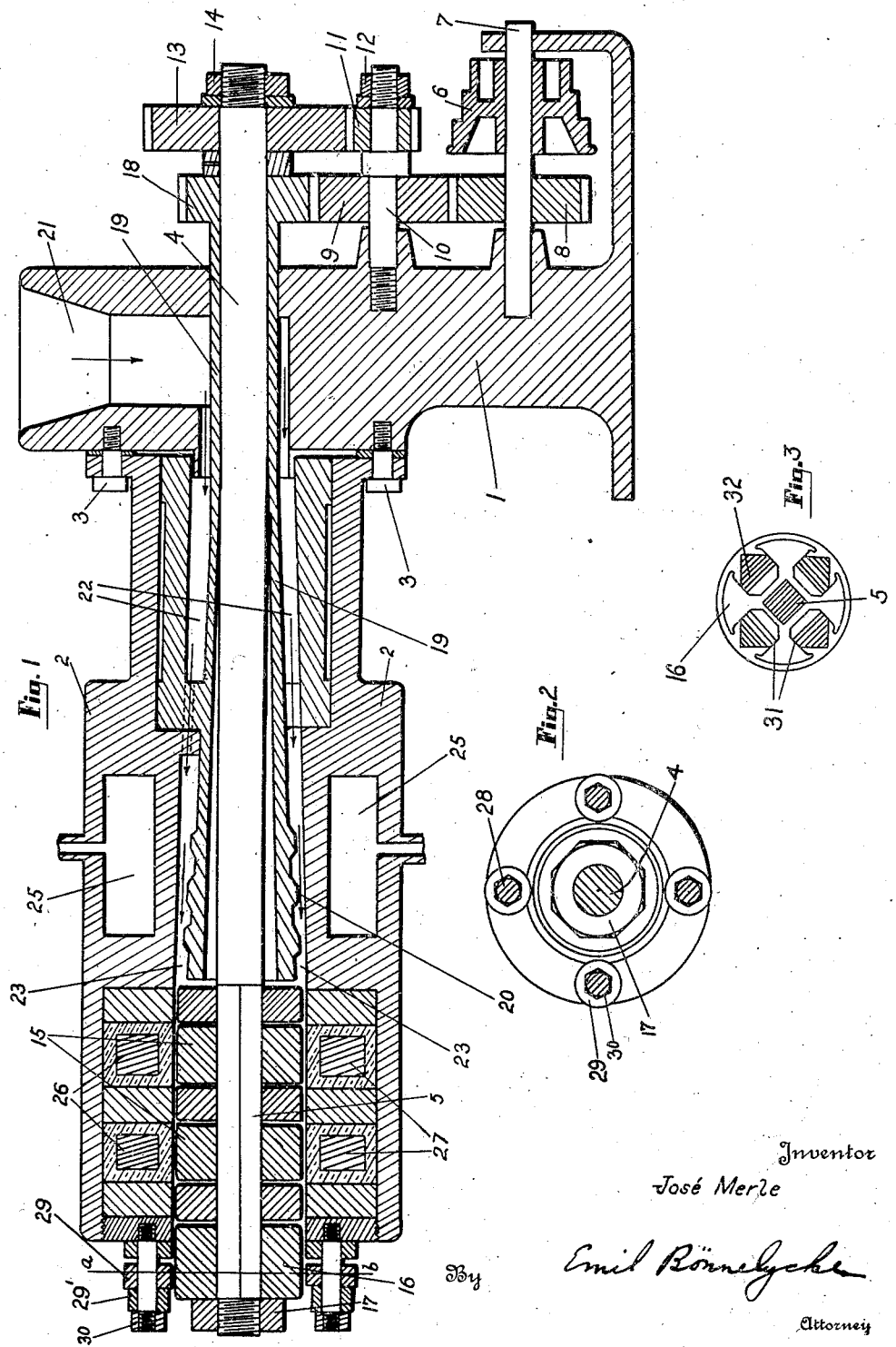

Inventor
José Merle

By Emil Bönnelycke
Attorney

Patented Jan. 24, 1928.

1,657,132

UNITED STATES PATENT OFFICE.

JOSÉ MERLE, OF BUENOS AIRES, ARGENTINA.

METHOD OF MANUFACTURING SOLID PRODUCTS OUT OF ONE OR MORE LIQUID OR PLASTIC MATERIALS.

Application filed March 27, 1923. Serial No. 628,073.

My present invention relates to a new method and apparatus for mixing, compressing, moulding, solidifying, rolling, laminating, drawing, turning, milling, screwcutting, etc., in a continuous way one or more liquids or plastic materials, its main object being to provide a process and an automatic machine for carrying out some or all of the above named operations in order to obtain in a single operation and machine all kinds of finished metallurgical and other products made of plastic substances in the shape of tubes, plates, bars, wires, etc., of any shape and cross-section and of any predetermined length.

Having this and other objects in view, the invention consists mainly in the features hereinafter described and clearly set forth in the appended claiming clauses.

The method according to my present invention consists mainly in pouring the plastic or liquid material or materials to be worked into a fixed mould which is open at one end and within which a turning body or bodies such as a chuck operates gradually and successively on small masses of the fed material or materials, there being if desired other rotary bodies with tools turning at the same or different speed than the chuck which may be acted on by centrifugal force if desired.

The system according to my present invention includes further means for cooling or reheating the raw material or the product in the course of manufacture, said means being placed at suitable points in the mould and subjected to independent regulation so that suitable temperatures may be obtained along the mould according to the kind of operation which is being carried on therein.

My method also includes the provision of means for introducing in the mould at the time of operation one or more additional raw materials, to be mixed or superposed innerly or outerly to the product being manufactured within the said mould.

The apparatus for carrying into practice my present invention includes two distinct and demountable parts, viz:

(a) a fixed mould consisting of any suitable number of adjustable portions, which may also be dismounted and which permit the regulation of the cooling as well as the reheating of the products being formed therein and carrying also one or more dies or tool holders adapted to regulate the shape, diameter and outer size of the products formed therein, said tools working by drawing, rolling, laminating, turning, milling, etc.

(b) A central rotary apparatus which rotates within the said fixed mould and to which, at one of its ends, are fed one or more materials in a liquid or plastic state from suitable receptacles, said materials being compressed and projected towards the other end by the aid of centrifugal force resulting from the said rotation and which are then mechanically mixed and forced to pass through orifices whose jet is broken by stops fixed to the inner surface of the mould or any other suitable device, the liquid or plastic mixture being then cooled and solidified while turning due to the acquired speed and to the turning of the inner revolving chuck. The centrifugal force which is thus created continues and maintains the compression. When using several liquid or plastic materials a complete mixture of the same or only a superposition and adherence may be obtained. In all cases, the solidified product in a hot state and being constituted by a single or by more than one material mixed or superposed is subjected to an operation of forging, drawing, rolling, laminating, turning, milling, screw-cutting etc. by the action of the tools disposed on the tool-holding axle which turns within the mould, said tools being fixed or revolving or capable of turning with regulable counterweights by means of centrifugal force, and being rotated at convenient speeds according to the nature of the finished product and of the material being worked. The worked product may be subjected to one or several heatings or coolings by means of regulable outer sources of heat or cold, so as to give to the worked product the consequent physical state corresponding with the nature of the work being done at that moment by each of the tools.

As explained, the product emerges continuously from the machines, perfectly finished and having been subjected to the following mechanical and physical actions: A complete mixture, which ensures a perfect homogenity, a centrifugal and centripetal compression which eliminates all the gases contained therein; successive forgings, drawings, rolling laminations, etc., in a longitudinal and lateral direction, and also according to the generatrix of different pitches of screws which insures a regular and uniform work on all the products, the uniformity of its section and of its sizes and like physical, chemical, mechanical and crystallographical conditions throughout.

Linings internal and external or both may be also obtained of any kind, in a hot or a cold operation, such as coppering, galvanizing, turning, tarring, etc., and in a single operation and with a perfect adherence as the initial product is being worked out of contact with the air which avoids any possibility of oxidation and insures clear surfaces.

In order that my present invention may be clearly understood and easily carried into practice some preferred embodiments of the same have been shown in the appended drawings, wherein, Figure 1 is a vertical longitudinal section of a preferred embodiment of my present invention.

Figure 2 is a front elevation from the discharging end of the same.

Figure 3 is a transverse section of the mould through one of the tools.

Similar characters of reference denote same or like parts throughout the said drawings.

Figure 4:
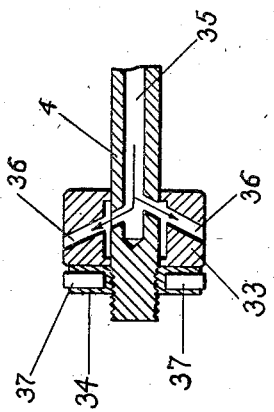
Figure 4 shows one of the inner tools as constructed for the inner lining of the product with one or more additional materials.

It is to be clearly understood that my present invention is in no way limited to the specific constructions shown and described, said constructions having been given only by way of example. The section of the mould, the manner of supporting the same and the number, disposition and shape of the tools or series of tools used, as well as their rotation and the relative speeds therefrom may be altered according to the nature of the product to be manufactured and according to the nature of the material or materials used in its manufacture.

In the embodiment shown in Figures 1 to 3 inclusive, 1 is the support on which the body of the mould 2 is fixed by the screws 3 or in any other convenient manner. A central axle 4 passes longitudinally through the said mould, said axle being hollow if desired and having a square or like cross section 5 at its end so as to allow the adjustment thereon of one or more tools 15 and 16 which are held in position by the nut 17. 6 is a cone of pulleys fixed on the axle 7 and through which movement is transmitted from any suitable source of energy. The same axle 7 carries a geared wheel 8 which meshes with the geared wheel 9 fixed on an intermediate axle 10 which in its turn carries a second geared wheel 11 held in position by means of the nut 12. The geared wheel 11 meshes with a geared wheel 13 rigidly mounted on the aforesaid axle 4, so that the said axle 4 receives its rotary movement from the cone of pulleys 6. The geared wheel 9 also meshes with a geared wheel 18 fixed at one end to the bushing 19 which is mounted on the axle 4 in such a manner that the said axle 4 and the bushing 19 may rotate at different speeds but in the same direction of rotation. The end of the said bushing 19 which lies within the mould 2 is enlarged so as to form a rotary chuck. 21 is the charging receptacle for the material or materials to be worked, said receptacle discharging at its lower end in channels formed around the said bushing towards a cavity or annular chamber 22 formed within the enlarged body of the said bushing out of which the material or materials pass through channels into the free space left between the chuck and the mould as shown at 23, where said material or materials are subject to a mixing operation by means of the projected portions 20 on the bushing 19. Around the said portion of the mould 2 there are one or more tanks or refrigerating chambers 25 by means of which the speed of solidification and the temperature of the material may be conveniently regulated according to the nature of the work desired.

On the end of the mould 2, and around the tool or tools 15 and 16 there are electric or other equivalent heating means 26 and 27 which allow a regulable heating or annealing at suitable points of the material or product under treatment so that the work of the aforesaid tools may be effected under the most perfect thermal conditions in each case.

28 is an axle supported at the end of the mould 2 on which may rotate the rollers 29 and 29' which act upon the outer surface of the finished product, the rollers being held in position by the nuts 30.

The tools 15 and 16 may be of any suitable shape or nature according to the material or materials to be treated and to the product to be manufactured and if convenient, they may be provided as shown in Figure 3 with guiding channels 31 on which radial wedges 32 may slide, said wedges being pressed against the inner surface of the product by action of the centrifugal force.

Figure 4 shows a device for innerly covering the material or product in the course of manufacture. In this case, the axle 5 is constructed with an inner bore through which the lining material is fed in a liquid or plastic state. Said material passes through the channel 35 and the branches 36 to the inner surface of the tube or other product in course of manufacture. 33 is the equivalent of any of the tools 15 or 16 which is held in position by the nut and has finishing and distributing rollers 37 thereon. On the outer side a covering may be obtained in a similar manner by providing the mould 2 with suitable channels from one or more receptacles not shown in the drawings. The rotation of the product on one part and the action of the outer working rollers allow a perfect finish and a complete adherence. As it is obvious from the foregoing, bimetallic, trimetallic or like bodies may be obtained with layers of a regulable thickness according to the circumstances desired.

Figure 6:
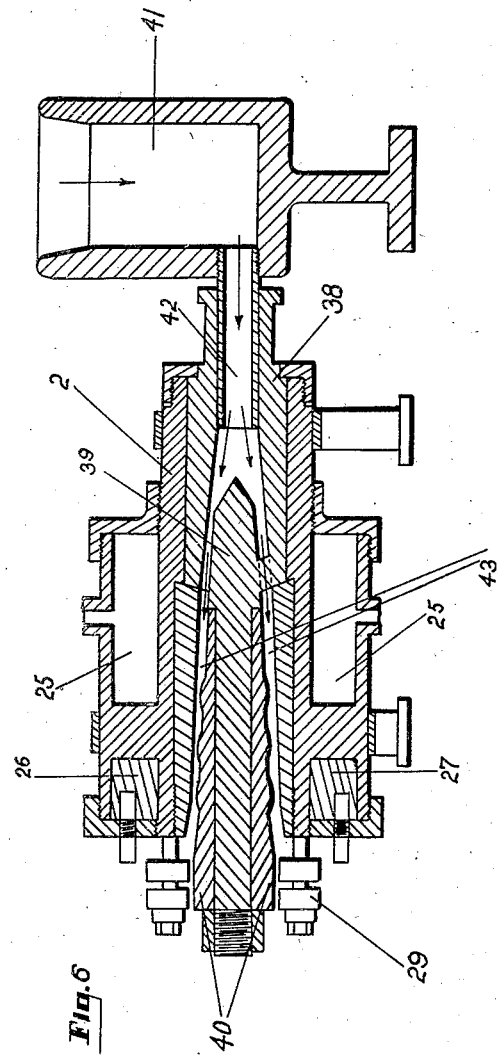
Figure 6 is a vertical longitudinal section of another embodiment of my present invention.

Figure 6 shows another embodiment of the machine in which the axle 4 has been eliminated as well as the tools carried thereby, the chuck being in this case interchangeable. In this construction, 38 is the bushing which ends in a chuck-holder 39 on which the chuck 40 is adjusted and held in position by means of a nut or any other suitable device. 41 is the charging receptacle connected to the tube 42 which discharges at its other end into a cavity formed within the chuck-holder, the material passing therefrom through channels to the free spaces 43 wherein it is subjected to the work of the chuck 40.

Figure 5:
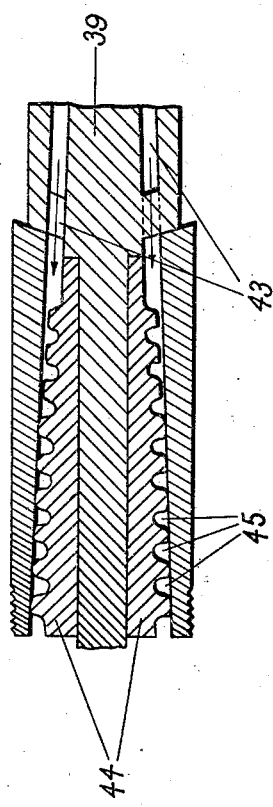
Figure 5 is a section which illustrates a special chuck for the manufacture of wires and finally.

Figure 5 shows a specific form of chuck 44 with helicoidal channels of any suitable cross-section, said chuck being fixed on the chuck-holder 39 (Figure 6). The diminishing channels form one or several wires or profiles of any suitable cross-section, as shown at 45, said wires being wound on suitable revolving drums if desired.

The working of the machine according to my present invention does not require any further explanation as it will be clearly understood by all experts in the art.

As aforesaid, the present invention is not limited to the specific apparatus or operations described, but includes any others within its scope which will be clearly set forth in the appended claiming clauses. On the other hand, it is obvious that these different operations will be obtained by using different internal shapes of the mould 2 and corresponding or different shapes of the tools or series of tools, which may rotate or not with respect to the mould which in all cases is fixed.

Having now fully described and ascertained the nature of my present invention and in what manner the same is to be carried into practice, I declare that what I claim and desire to protect by Letters Patent is:

1. A molding machine comprising a supporting base member having a metal charging receptacle therein; a mold secured to said base member and in communication with said receptacle and having a cooling receptacle therein; an axle rotatably mounted in said mold and said base; a bushing member rotatably mounted on said axle; a plurality of tools mounted on said axle; a plurality of tools mounted on said mold; heat-means in said mold; and means for rotating said bushing and said axle in the same direction at different speeds.

2. A molding machine comprising a supporting base member having a metal charging receptacle therein; a mold secured to said base member and in communication with said receptacle; an axle rotatably mounted in said mold and said base member; a bushing member rotatably mounted on said axle; means on said axle and in said mold for shaping the casting; and means for rotating said bushing and said axle in the same direction at different speeds.

3. A molding machine comprising a supporting base member having a metal charging receptacle therein; a mold secured to said base member and in communication with said receptacle; tool supporting means in said mold and in said base member; mixing and feeding means in said mold and said base member; and means for actuating said means to produce a continuous casting of any desired cross-section.

4. The method of working plastic substances, which comprises the steps of projecting the substance forcibly into a mold under relatively great pressure obtained by the action of centrifugal force, and then casting the substance in the mold.

5. A molding machine comprising a supporting base member having a metal charging receptacle therein; a mold secured to said base member and in communication with said receptacle and having a cooling receptacle therein; an axle rotatably mounted in said mold and said base; a bushing member rotatably mounted on said axle; a plurality of tools mounted on said axle; a plurality of tools mounted on said mold; heating means in said mold; and a plurality of gear wheels for rotating said bushing and said axle in the same direction of rotation but at different speeds.

6. A molding machine comprising a supporting base member having a metal charging receptacle therein; a mold secured to said member and in communication with said receptacle and adapted to receive the molten metal therefrom; an axle rotatably mounted in said mold and said base member; a bushing member rotatably mounted on said axle and adapted to shape the molten metal; a plurality of tools mounted on said axle and in said mold and adapted to finish the casting; and means for rotating said bushing and said tools.

7. A method of working plastic substances or metals which comprises extruding and casting the substance by the action of pressure attained by centrifugal force, the pressure depending upon the characteristics of the casting to be produced and the properties to be imparted therein.

8. A method of working metals which comprises purifying, projecting and casting the metal by the action of high pressure of a variable and regulable intensity attained by centrifugal force while the metal passes from the liquid to the plastic and to the solid state, the pressure depending upon the characteristics of the casting to be produced and the properties to be imparted therein.

9. A method of working plastic substances or metals which comprises extruding the substance through a mold by the action of a pressure attained by centrifugal force, the pressure depending upon the characteristics of the casting to be produced and the properties to be imparted therein.

10. The method of working plastic substances or metals which comprises rotating a mass of the substance at high speed in a centrifugal apparatus and extruding the same from said apparatus by the centrifugal force of its rotation, the direction of projection being inclined to the axis of rotation.

11. The method of casting plastic substances or metals which comprises delivering to a rotating member a quantity of the substance and forcibly projecting it into a mold by the centrifugal force obtained by such rotation.

12. A method of casting plastic substances or metals which comprises extruding the substance through a mold by the action of pressure attained by centrifugal force.

13. A method of working plastic substances or metals which comprises the continuous steps of placing the substance under high pressure attained by centrifugal force, extruding the substance, and then casting and finishing the substance under the action of said pressure, the pressure depending upon the characteristics of the casting to be produced and the properties to be imparted therein.

14. A method of working plastic substances or metals which comprises the continuous steps of mixing and extruding the substance under the action of a high pressure attained by centrifugal force, casting the substance in a mold, and then finishing the substance in the mold, the pressure depending upon the characteristics of the casting to be produced and the properties to be imparted therein.

15. A method of working plastic substances or metals which comprises the continuous steps of projecting and casting the substance into a plurality of distinct and adherent layers under the action of high pressure attained by centrifugal force, the pressure depending upon the characteristics of the casting to be produced and the properties to be imparted therein, and finishing the casting.

16. A method of working plastic substances or metals which comprises the continuous steps of projecting and casting the substance in the mold into a plurality of distinct and adherent layers under the action of high pressure attained by centrifugal force, the pressure depending upon the characteristics of the casting to be produced and the properties to be imparted therein, and shaping and finishing the casting in the mold.

17. A method of working plastic substances or metals which comprises the continuous steps of placing the substance under a high pressure attained by centrifugal force, extruding the substance under the action of said pressure, and casting the substance under the action of mechanical compression.

18. The method of making solid metal articles from metals, which comprises delivering the metal in plastic or molten condition to a rotating member, and extruding the metal from said member by the action of centrifugal force, the centrifugal force having a component in the direction of the axis of rotation.

19. The method of casting plastic substances or metals, which comprises delivering to a rotating member a quantity of the substance and extruding the substance into a cooling chamber through a plurality of openings in said member by the action of centrifugal force.

20. A method of working plastic substances or metals which comprises the continuous steps of placing the substance under a high pressure attained by centrifugal force, mixing and extruding the substance, and casting the substance in a mold under the action of mechanical compression.

21. The method of producing solid articles from metals, which comprises rotating the metal at high speed in a centrifugal member and extruding it into a cooling chamber through openings in the member by the centrifugal force due to the rotation of the member.

22. A method of working plastic substances or metals which comprises the continuous steps of placing the substance under a high pressure attained by centrifugal force; mixing and extruding the substance; casting the substance by forcing it through a fixed mold; and finishing the casting while traversing through the mold.

23. A casting machine for plastic substances or metals comprising a mold; and means associated with said mold adapted to place the substance under pressure by means of centrifugal force and including means to extrude the substance into and through the mold.

24. A casting machine for plastic substances or metals comprising a fixed mold; and a rotary chamber associated with said mold adapted to place the substance under high pressure by means of centrifugal force and including means to project the substance into and through the mold.

25. A casting machine for plastic substances or metals comprising a fixed mold; a mixing chamber in said mold; and a rotary chamber associated with said mold adapted to place the substance under high pressure by means of centrifugal force and including means to extrude the substance into and through the mixing chamber and the mold.

26. A casting machine for plastic substances or metals comprising a mold; a mixing chamber in said mold; means in said mixing chamber for mixing the substance; and a rotary chamber associated with said mold adapted to place the substance under high pressure by means of centrifugal force and including means to extrude the substance into and through the mixing chamber and the mold.

27. A casting machine for metals comprising a mold; a rotary chamber associated with said mold adapted to place the metal under high pressure by means of centrifugal force and including means to extrude the metal into and through the mold; and means in the mold for finishing the casting.

28. A casting machine for metals comprising a mold; a rotary chamber associated with said mold adapted to place the metal under high pressure by means of centrifugal force and including means to extrude the metal into and through the mold; and means in the mold and on the outside thereof for finishing the casting.

29. A casting machine for metals comprising a mold; a mixing chamber in said mold; a rotary chamber associated with said mold adapted to place the metal under high pressure by means of centrifugal force and including means to project the metal into and through the mixing chamber and the mold; and means in the mold and means on the outside thereof for finishing the casting.

30. A casting machine for metals comprising a fixed mold; a mixing chamber in said mold; a rotary chamber associated with said mold adapted to place the metal under high pressure by means of centrifugal force and including means in order to project the metal into and through the mixing chamber and the mold; means in the mold for cooling the casting; and a charging receptacle to feed the liquid metal into the rotary chamber.

31. A casting machine for metals comprising a fixed mold; liquid metal charging means at one end of said mold; and a rotary chamber in said mold and adjacent said charging means, said chamber having conical side portions to impart an increasing pressure to the liquid metal to thus extrude the metal into and through the mold.

32. A casting machine for metals comprising a fixed mold; liquid metal charging means at one end of said mold; a mixing chamber in said mold; and a rotary chamber in said mold and adjacent said charging means, said chamber having conical side portions to impart an increasing pressure to the liquid metal to extrude the metal into and through the mold.

33. A casting machine for metals comprising a fixed mold; a mixing chamber in said mold; a rotary chamber associated with said mold adapted to place the metal under high pressure by means of centrifugal force in order to project the metal into and through the mixing chamber and the mold; means in the mold for cooling the casting; a charging receptacle in order to feed the liquid metal into the rotary chamber; and means in said mold to finish the casting.

34. A casting machine for metals comprising a fixed mold; a mixing chamber in said mold; a rotary chamber associated with said mold adapted to place the metal under high pressure by means of centrifugal force in order to project the metal into and through the mixing chamber and the mold; means in the mold for cooling the casting; a charging receptacle at one end of said mold in order to feed the liquid metal into the rotary chamber; and a plurality of tools in the other end of said mold to finish the casting.

35. The method of working plastic substances or metals which comprises delivering a quantity of the substance to a rotating member, and extruding the substance from the member by the centrifugal force obtained from the rotation thereof.

36. The method of working plastic metal, which consists in rotating a mass thereof within a chamber, extruding the same through a plurality of openings through the periphery of the chamber, and cooling the extruded metal in a mold adjacent the chamber.

37. A casting machine for metals comprising a cooling chamber; liquid metal charging means adjacent thereto; and a rotary chamber adapted to receive the metal from the charging means and deliver it to the cooling chamber, said rotary chamber having conical side portions to impart a pressure to the metal to extrude it into the cooling chamber.

38. The method of working plastic substances or molten metals which consists in rotating a mass thereof within a chamber;

projecting and extruding the same through a plurality of openings through the periphery of the chamber; and cooling the extruded products in a cooling chamber adjacent to the rotating chamber.

39. A method of producing products from plastic substances or metals which comprises subjecting the substance to centrifugally-generated pressure and extruding it under the action of said centrifugally-generated pressure.

40. A machine for working plastic substances or metals comprising means for rotating a mass of the substance at high speed; and a mold through which the substance is extruded by the centrifugal force of its rotation.

JOSÉ MERLE.